United States Patent
Mancilla Montiel

(10) Patent No.: US 12,477,300 B2
(45) Date of Patent: Nov. 18, 2025

(54) DISTRIBUTED WIRELESS NETWORK ASSISTED OBJECT LOCATION

(71) Applicant: FORD GLOBAL TECHNOLOGIES, LLC, Dearborn, MI (US)

(72) Inventor: Miguel Mancilla Montiel, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 443 days.

(21) Appl. No.: 17/346,502

(22) Filed: Jun. 14, 2021

(65) Prior Publication Data

US 2021/0306813 A1    Sep. 30, 2021

Related U.S. Application Data

(63) Continuation of application No. 16/521,979, filed on Jul. 25, 2019, now Pat. No. 11,070,947.

(51) Int. Cl.
*H04W 4/029* (2018.01)

(52) U.S. Cl.
CPC .................................. *H04W 4/029* (2018.02)

(58) Field of Classification Search
CPC ............. H04W 72/0453; H04W 14/16; H04W 52/243; H04W 24/00
See application file for complete search history.

(56) References Cited

U.S. PATENT DOCUMENTS

| | | | |
|---|---|---|---|
| 8,487,755 B2 * | 7/2013 | Gudgel | H04W 4/029 340/539.1 |
| 9,237,544 B2 * | 1/2016 | Reshef | H04W 64/00 |
| 9,911,020 B1 | 3/2018 | Liu et al. | |
| 11,122,112 B1 * | 9/2021 | Gomez | H04L 67/52 |
| 11,611,610 B2 * | 3/2023 | Cambridge | H04W 4/24 |
| 2003/0048353 A1 * | 3/2003 | Kenoyer | H04N 7/142 348/E7.081 |
| 2009/0156230 A1 * | 6/2009 | Versteeg | G01S 5/0278 455/456.1 |
| 2011/0178373 A1 * | 7/2011 | Pacey | A61B 5/24 600/300 |
| 2013/0040649 A1 | 2/2013 | Soto Matamala et al. | |
| 2013/0169922 A1 * | 7/2013 | Austin | G02C 1/08 351/178 |
| 2016/0028455 A1 * | 1/2016 | Ma | H01Q 1/246 375/297 |
| 2017/0280289 A1 * | 9/2017 | Skaaksrud | G08B 21/18 |

(Continued)

FOREIGN PATENT DOCUMENTS

| | | |
|---|---|---|
| CN | 201811261370 A | 2/2019 |
| WO | 2015149107 A1 | 10/2015 |

(Continued)

*Primary Examiner* — Lewis G West
(74) *Attorney, Agent, or Firm* — Frank Lollo; Brooks Kushman P.C.

(57) ABSTRACT

A server may receive a request from a remote device to wirelessly locate an object that includes a wireless identification device. The server may also instruct one or more wireless-search enabled devices, comprising a predefined requestor network of devices, to attempt to locate the object. The server may further receive responses from the one or more devices in the network reporting results of attempts to locate the object and notify the remote device of at least one result.

19 Claims, 5 Drawing Sheets

(56) References Cited

U.S. PATENT DOCUMENTS

| | | | | |
|---|---|---|---|---|
| 2018/0242102 A1* | 8/2018 | Lévêque | ............... | G08B 21/24 |
| 2018/0295598 A1* | 10/2018 | Donnellan | ............. | G01S 5/012 |
| 2019/0124166 A1* | 4/2019 | Yoshida | ................ | H04L 67/52 |
| 2019/0231097 A1* | 8/2019 | Johnson | ............... | H04W 4/029 |
| 2021/0021963 A1* | 1/2021 | Mohalik | ............... | G06N 20/00 |
| 2022/0074757 A1* | 3/2022 | Edelman | ............ | G01C 21/3644 |
| 2022/0237637 A1* | 7/2022 | Susel | ................ | G06Q 30/0203 |
| 2023/0072249 A1* | 3/2023 | Mehrotra | ............ | H04W 68/02 |

FOREIGN PATENT DOCUMENTS

| | | | | |
|---|---|---|---|---|
| WO | 2016093541 | | 6/2016 | |
| WO | WO-2019123469 A1 * | | 6/2019 | ........... G01S 5/0269 |

\* cited by examiner

DISTRIBUTED WIRELESS NETWORK ASSISTED OBJECT LOCATION

CROSS-REFERENCE TO RELATED APPLICATIONS

This application is a continuation of U.S. application Ser. No. 16/521,979 filed Jul. 25, 2019, now U.S. Pat. No. 11,070,947, issued Jul. 20, 2021, the disclosure(s) of which is (are) hereby incorporated in its (their) entirety by reference herein.

The illustrative embodiments generally relate to methods and apparatuses for distributed wireless-network-assisted object location.

BACKGROUND

Many small objects people use in their daily lives are easily misplaced. From keys, to phones, to wallets, to remote controls, devices and objects that are frequently picked up, moved and set down, are often set in forgotten locations. Historically, finding these devices has been a manual searching task, but modern advances in technology have made it somewhat easier to locate a device.

In some instances, devices now come with built-in locator functions, which often comprise a small radio frequency identifier (RFID) tag or BLUETOOTH low energy (BLE) chip. The user will also possess a transponder or transceiver, which is capable of activation of the RFID tag and/or communication with a BLE chip. When a signal is received from the tag/chip, the system that includes the transponder or transceiver can often indicate a direction or proximity of the missing device including the tag/chip.

SUMMARY

In a first illustrative embodiment, a system includes a server processor configured to receive a request from a remote device to wirelessly locate an object that includes a wireless identification device. The processor is also configured to instruct one or more wireless-search enabled devices comprising a predefined requestor network of devices to attempt to locate the object. The processor is further configured to receive responses from the one or more devices in the network reporting results of attempts to locate the object and notify the remote device of at least one result.

In a second illustrative embodiment, a method includes sending instructions to wirelessly locate an object identified in a location request, received from a requestor, the request sent to a predefined requestor network including a plurality of devices capable of wireless location. The method also includes receiving results from attempts by each of the plurality of devices that attempted to wirelessly locate the object and, responsive to none of the plurality of the devices locating the object, sending notification to the requestor identifying each device that attempted and failed to wirelessly locate the object.

In a third illustrative embodiment, a method includes sending first instructions to wirelessly locate an object identified in a location request, received from a requestor, the request sent to a predefined requestor network including a plurality of devices capable of wireless location. The method also includes receiving results from attempts by each of the plurality of devices that attempted to wirelessly locate the object. The method further includes, responsive to none of the plurality of the devices locating the object, defining an expanded network of devices including a device, capable of wireless location, not in the requestor network but within a predefined proximity of a device in the requestor network and sending second instructions to the expanded network to wirelessly locate the object.

DETAILED DESCRIPTION

As required, detailed embodiments are disclosed herein; it is to be understood, however, that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

While device-location systems using wireless location techniques have improved object location and detection time, they are often located at a singular site and in a fixed location. That is, if a wallet includes an RFID tag, the system works for identifying the presence of the tag (and thus the wallet) if the wallet is lost at home, but is not useful for finding the tag/wallet anywhere else, unless the transceiver/transponder is carried to any or every location where the wallet may have been lost.

In addition to home searching systems previously mentioned, which are often stand-alone commercial solutions, many devices now include BLE transceivers, as well as internet connection capability. The illustrative embodiments provide and leverage a personal network of such devices to perform a broader form search, as well as leverage an even wider semi-public network of devices to locate certain missing objects.

A user, using a computer application on a personal computer or mobile device (e.g., cell phone, smart watch, etc.), can search for a missing object, using a pre-existing personal network of devices, and some or all of that user's personal network can respond to the search request by individually searching a locality around each device. The object may have native BLE functionality, or a small BLE or RFID chip/tag may be affixed to or embedded into the object, allowing it to respond to a search request from a nearby device.

So, for example, if user A leaves a wallet in user B's vehicle, and user A subsequently searches for the wallet using a home device alone, the home device will not find the wallet and user A will only know that the wallet is not within range of the home device. On the other hand, if user A's vehicle, user B's vehicle and the home device all search for the wallet in response to the request, the user (in this instance), will discover the wallet in user B's vehicle. Even if the wallet was not found, however, user A would know that it was not at home or in any vehicle, which are the likely locations, and thus user A could more effectively conclude that the wallet had likely been lost/left-behind somewhere (e.g., a restaurant).

Figure 1:
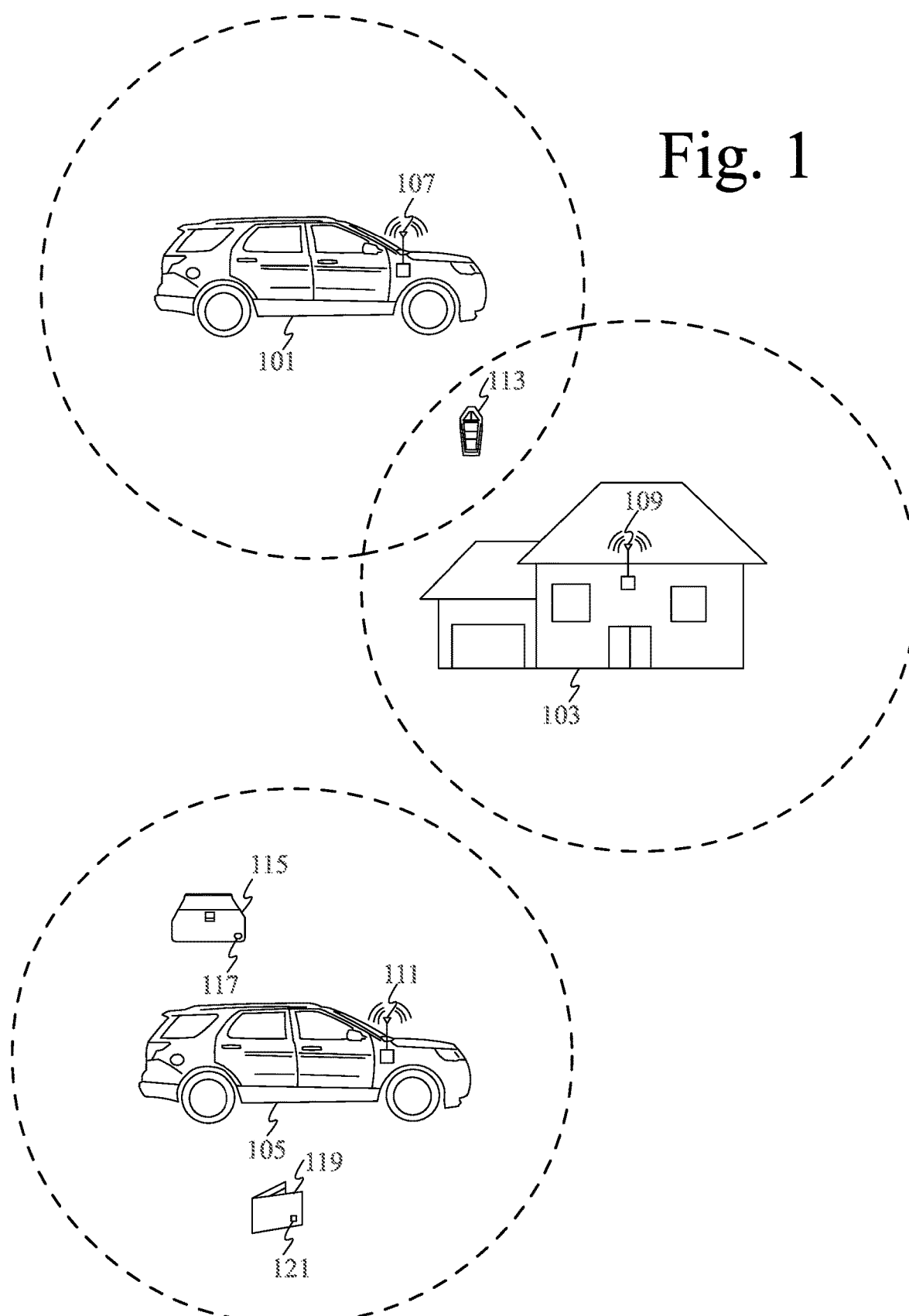
FIG. 1 shows an illustrative example of a detection system including multiple devices.

FIG. 1 shows an illustrative example of a detection system including multiple devices. In this example, a first vehicle 101 is parked at a home location 103, in a driveway or garage. A second vehicle 105 is traveling, away from the home location 103. Each vehicle 101, 105 and the home 103 includes a BLE transceiver 107, 109, 111, capable of localized communication with any BLE device within range 102, 104, 106 of the respective transceivers 107, 109, 111.

This example also includes an illustrative set of objects, which include a key fob 113, a purse 115 with a BLE chip 117 included therein, and a wallet 119 with a BLE chip included therein 121. Based on where a given object is located, one or more detection systems may be able to detect the chip included in the object. For example, the fob 113 is located such that it is detectable by both the vehicle 101 transceiver 107 and the home 103 transceiver 109. The purse 115 and wallet 119 are located in the vehicle 105, which is away from home 103, but both are detectable by the vehicle 105 transceiver 111.

In an illustrative example, user B is driving to work and they believe that they left the purse 115 at home. Since user B is driving, it may not be convenient for user B to enter a search request, but user B can easily call user A, who is still at home. User A can input a search request, leveraging all transceivers 107, 109, 111. This would reveal that, for example, the purse 115 was in the vehicle 105. If User B only searched for the purse 115, User B would know that the purse 115 was in the vehicle 105 and could tell User A that the purse was traveling with User A. If User B searched for all searchable objects, which is another possible option, User B would also know that the wallet 119 was in the vehicle 105. By leveraging a personal network of search devices, users can determine if any searchable objects are within range of any personal search device.

In this example, the search capability may also be enhanced by a service provider, such as an automotive original equipment manufacturer (OEM). The OEM provides the connection and search capability in this example, first allowing leveraging of a personal network of search devices. The OEM also has connections to a broader network of vehicles, many of which may include BLE search capability. If the user is unsuccessful at finding the object based on a personal network search, the OEM or other provider may provide access to a broader network, such as all vehicles, or all vehicles within range of one or more locations associated with the user. This could help locate objects that had been lost, as well as finding pets and or clothing (and the wearer) with BLE tags affixed thereto.

Figure 2:
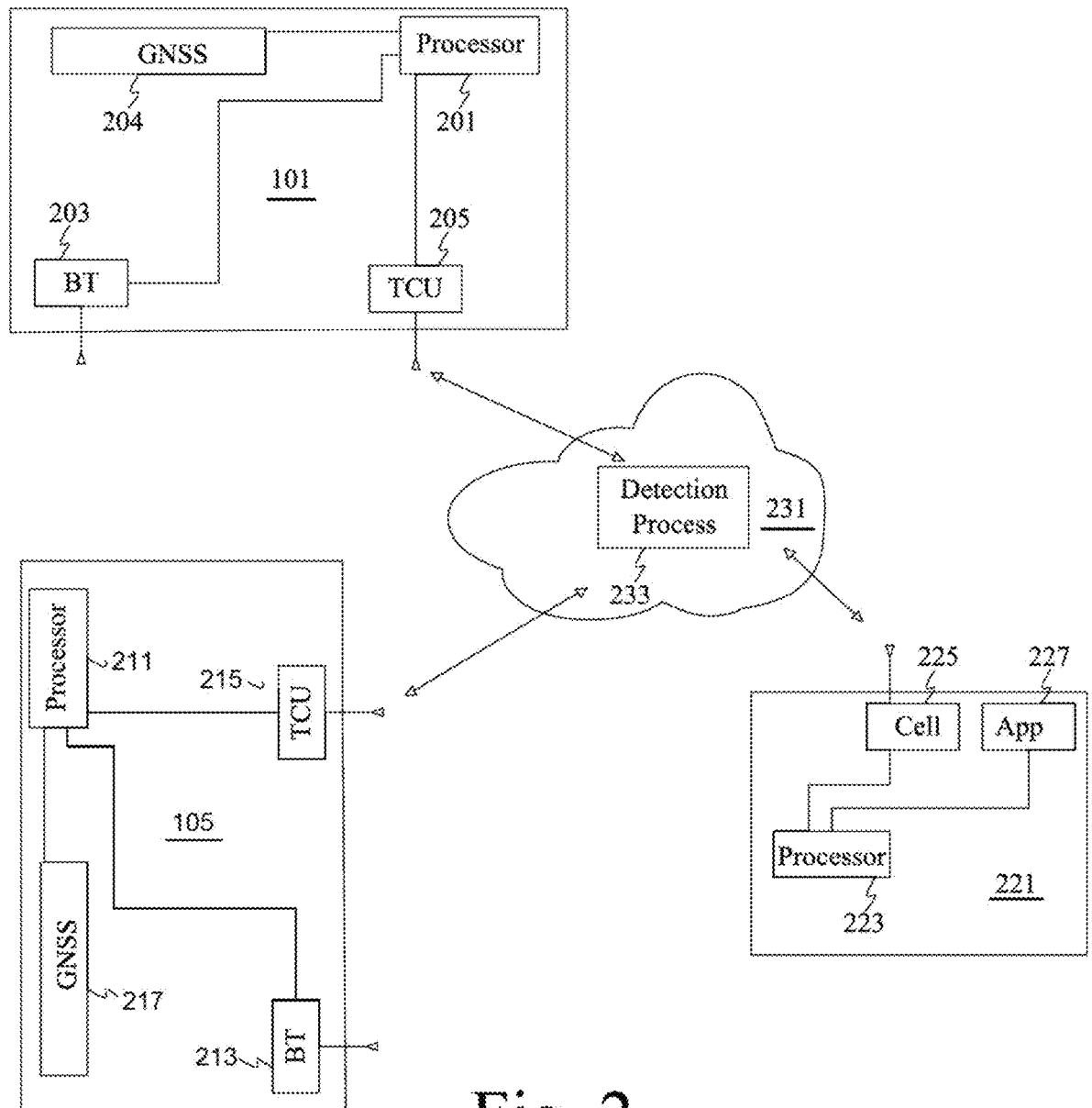
FIG. 2 shows another illustrative example of the detection system.

FIG. 2 shows another illustrative example of the detection system. In this example, the vehicle 101 includes a processor 201 which is in communication with and can send instructions to a BLE/BT transceiver 203. This transceiver, which is part of a vehicle computing system, may be capable of detecting local BLE devices (or objects with BLE tags). The vehicle 101 also includes a global navigation satellite system (GNSS) unit 204, capable of obtaining vehicle 101 coordinates such as global positioning system (GPS) coordinates. The vehicle further includes a telematics control unit (TCU) 205, which is capable of communication with a central search system 233 located remote from the vehicle 101 in the cloud 231.

The house 103 also includes a BLE/BT transceiver 207 which has a range of coverage covering all or some of the home 103, and which, in this example, is also connected to the cloud 231 through a wireless router 209. If the search process 233 has permission, it can leverage the home search system transceiver 207 through the router 209 cloud 231 connection.

One or more additional vehicles 105 may also be part of a personal or broad search network. In the former case, the user may be able to request on-demand use of the vehicle 105 search capabilities, and in the latter case the search system 233 provider may provide access to roaming vehicles 105 in an as-permitted scenario. That is, while the search provider certainly may allow on-demand access to the broad network, this could result in millions of search requests a day or week, as people hunt for lost objects, and so in the illustrative examples a set of constraints is imposed on when the broad network can be used, although such constraints are certainly not necessary.

The vehicle 105 also includes a processor 211, which is similarly connected to a GNSS 217 unit, a TCU 215 and a BLE/BT transceiver 213.

The system shown also includes a computing device 221, which can be a personal computer, mobile phone or other mobile device, or even a vehicle human machine interface (HMI). In this example a mobile phone is used, which has onboard processing 223 and a cellular transceiver 225 connecting the phone to the cloud 231.

The device 221 also includes a search application 227, which provides a search interface and search capability, allowing the user to leverage the user's personal and/or broad network of devices to search for detectable objects. Since vehicles often include some form of native search/response technology, rendering them capable of detecting fobs, for example, they are suitable candidates for inclusion in such a system. Those native technologies can be enhanced by further search sensors (NFC, RFID, etc.) which may serve dual-purposes and allow the vehicles to search for a wide range of detectable devices based on a variety of wireless signals.

Figure 3:
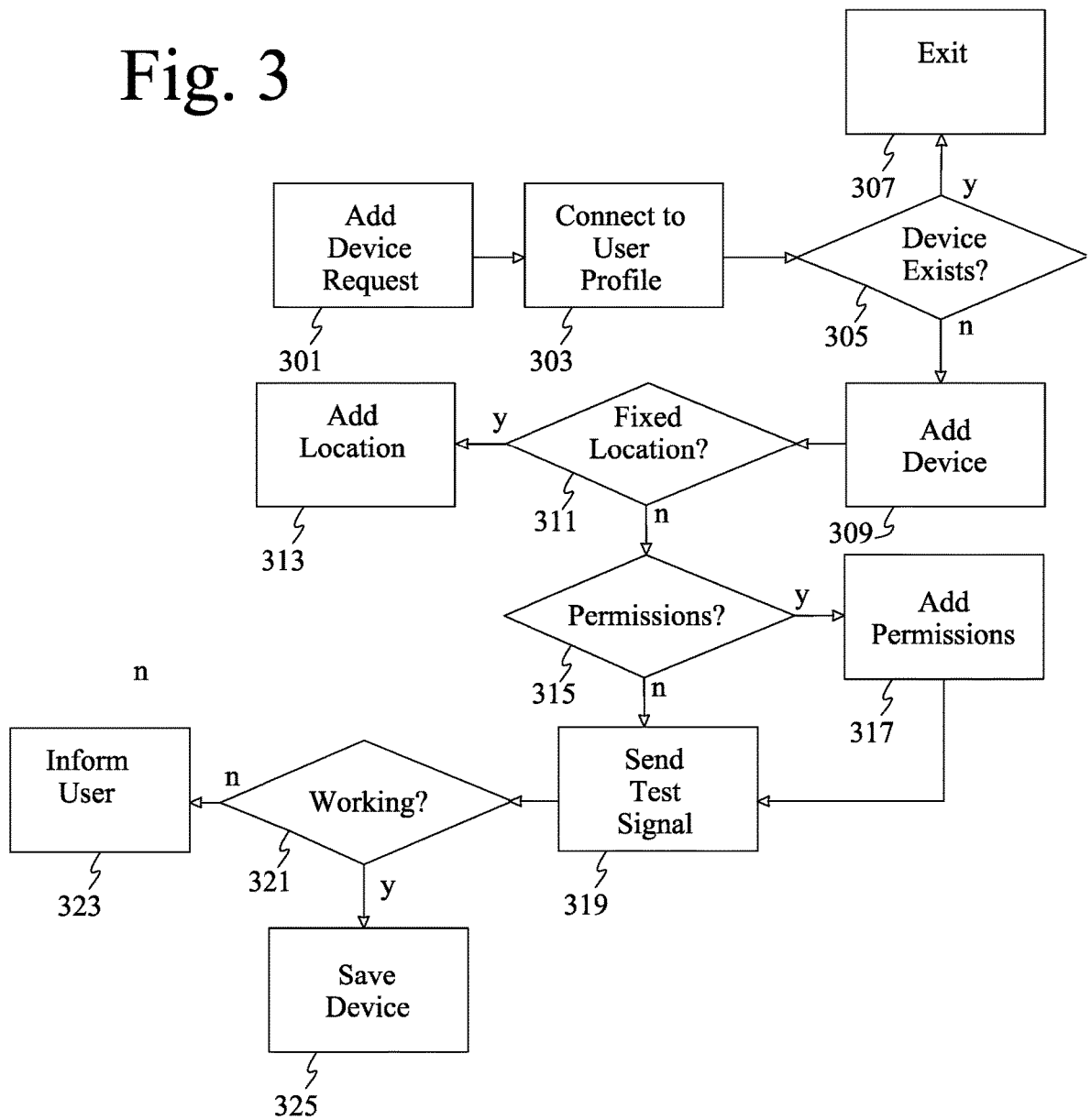
FIG. 3 shows an illustrative process for location device addition.

FIG. 3 shows an illustrative process for location device addition, executable by, for example a device 221 processor 223. In this example, a user adds a new device to a personal network of devices, allowing the user to expand their personal network dynamically as new search devices are purchased or otherwise obtained. In some instances, for example, the user may work at an office with one or more search-capable devices, and the user may have permission to add those devices to a personal network, to assist in determining if personal (wallet) or work (laptop) assets were left at or are located in the office.

The device 221 receives a request to add a new device at step 301. This causes the device 221 to connect to an existing user profile at 303, which may include a list of currently added devices that already belong to the personal user network. The user may have identified the new device as part of the initial request at 301, and the device 221 may determine at 305 whether the new device is already part of the user's network. If so, the process exits 307, otherwise the device 221 may enact a process allowing for addition of the new device to the user's personal network at 309.

Some devices, such as vehicles 101, 105, may have dynamic locations and may be able to self-identify their locations while traveling or remote. Other devices, such as home device 103, tend to have a static location and may be better associated with a named location (e.g., "home") than a set of coordinates or address/street location (which can be derived from coordinates). If the new device is a fixed location device, determined at 311, the device 221 may add a static location at 313, which may include having the user name a location that will be easy to understand at a glance (e.g. "office," "home," etc.).

The new device may also require authentication, and so if the new device is not native to a search provider network, whereby the search provider may have native authentication permissions to access the device (e.g., automotive OEM accessing a vehicle transceiver), the device 221 may determine or be informed that one or more permissions are needed at 315. Depending on the agreement with the manufacturer, even automotive owners, for example, may be able to require that the OEM receive explicit permission to access a vehicle transceiver. Often this can be in the form of an agreement to participate, whereby the user grants access in exchange for being able to use the broader network when needed.

The device 221 receives any needed permissions and authentication rights at 317, which can include, for example, a handshake, a key, or a login. The device 221 may also send a test request at 319, which can be a communication request to ensure that proper access credentials exist. If the search device (the new device) responds, the device 221 determines that the new device connection is working at 321, and can inform the user when the new device connection is not working at 323. Otherwise, the device 221 can save the new device 325.

This process is also executable by, for example, a cloud-based system facilitated by the mobile device 221 or PC interface, and search/add device requests from the mobile device 221 will often be handled by such a system in any event, even if the bulk of the processing is done onboard the mobile device 221.

Figure 4:
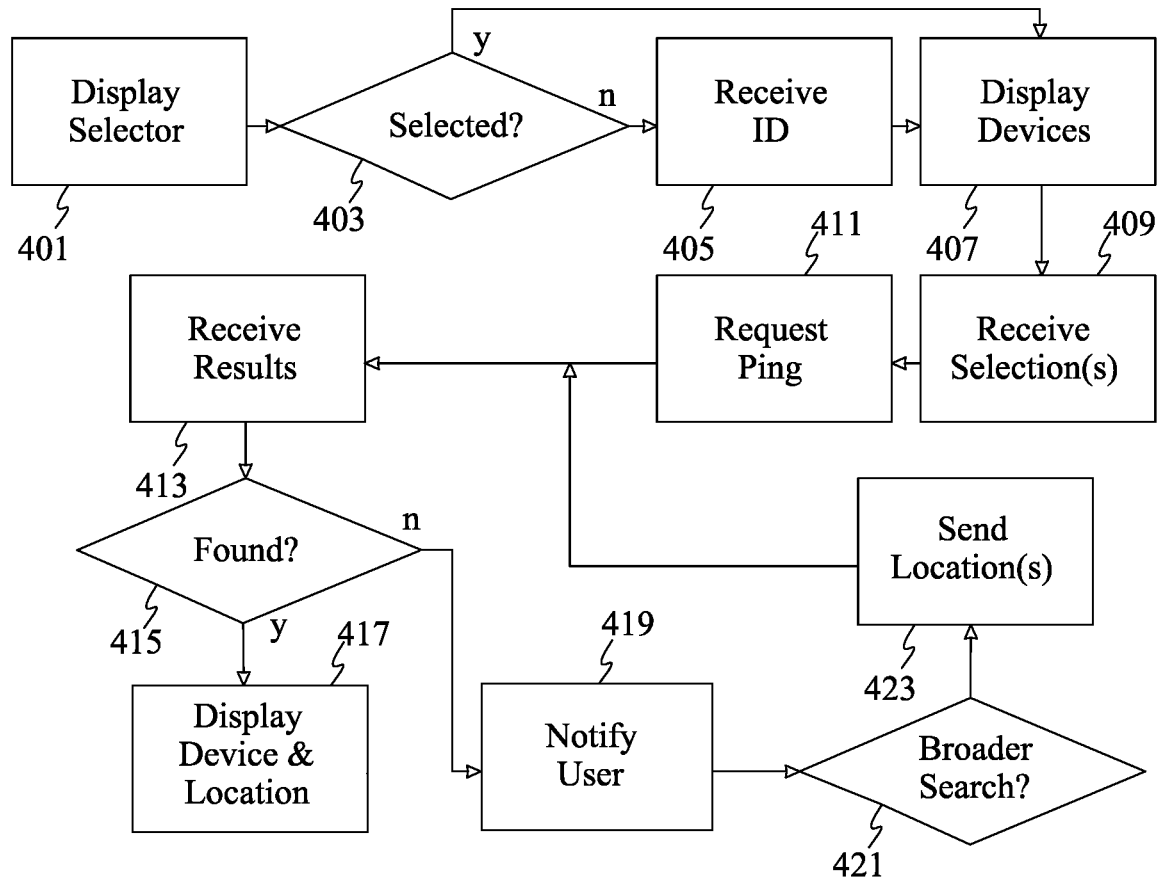
FIG. 4 shows an illustrative process for device location requesting.

FIG. 4 shows an illustrative process for device location requesting. This is an example of a process executable by, for example device 221 processor 223 or a system in communication with the cloud. In this example, the device 221 displays a selector at 401, which is a list of all known searchable objects. This can be a list of identifiable devices, a list of known tag identifiers (unique IDs assigned to tags affixed to items) or any other suitable list of devices that have been previously searched for or identified by the system.

If the user selects an object at 403, the device 221 will load the search identifier for that object, or will instruct the cloud to load a known search identifier for that object. If an existing object is not selected at 403, the device 221 receives a new device or tag identifier at 405. This can be, for example, a unique identifier associated with a purchased tag, usable for affixation to an object, or a native-ID provided by a device already including BLE communication capability.

Once the object identifier has been selected or input, the device 221 displays a list of search devices at 407, which, in this example, are the search devices in a user's personal network (e.g., home device(s), vehicle(s), etc.). The user can select a whole network of the search devices or may select specific ones of the search devices that the user is concerned with.

The device 221 receives selection of search devices at 409, and then sends a request to the cloud processing requesting a ping or search for the object at 411. The cloud, in a process illustrated in FIG. 5, sends a request to the selected search devices, searching for the object, and the device 221 receives the response to this request from the cloud at 413. The results can include, for example, a search device identifier identifying the object, a relative distance of the object from the search device (if detectable by, for example, received signal strength indicator RSSI or other wireless parameter), and a location of the search device (fixed location, such as home, dynamic location, such as address or coordinates).

If the results indicate that the object was found at 415, the device 221 can display the pertinent received information at 417, such as the name of the search device discovering the object and the location of the search device. The device 221 can also notify the user at 419 if the object was not found at 415, which in this example triggers an opportunity for a broader search, leveraging a larger, semi-public network at 421.

As previously noted, a search provider such as an automotive OEM may not want to field 100,000 daily requests for missing keys, but may be willing to leverage a certain portion of a network on behalf of a user who has already attempted use of a personal network. If the personal network is successful in fulfilling 95%+ of the requests, for example, this greatly reduces the load of requests going to the broader network.

The user may be able to specify one or more locations where the missing object may have been left (e.g., home, restaurant, parking garage, store, office, etc) at 423 and provide a business name or address if applicable. The search provider may then send requests (to vehicles, in this example) to search devices that are within a certain distance of the defined location(s). Again, the results list may return a search device location that discovered the object, or continued failures to find may continue to unlock broader search ranges (e.g., whole city, county, state, country, etc).

Figure 5:
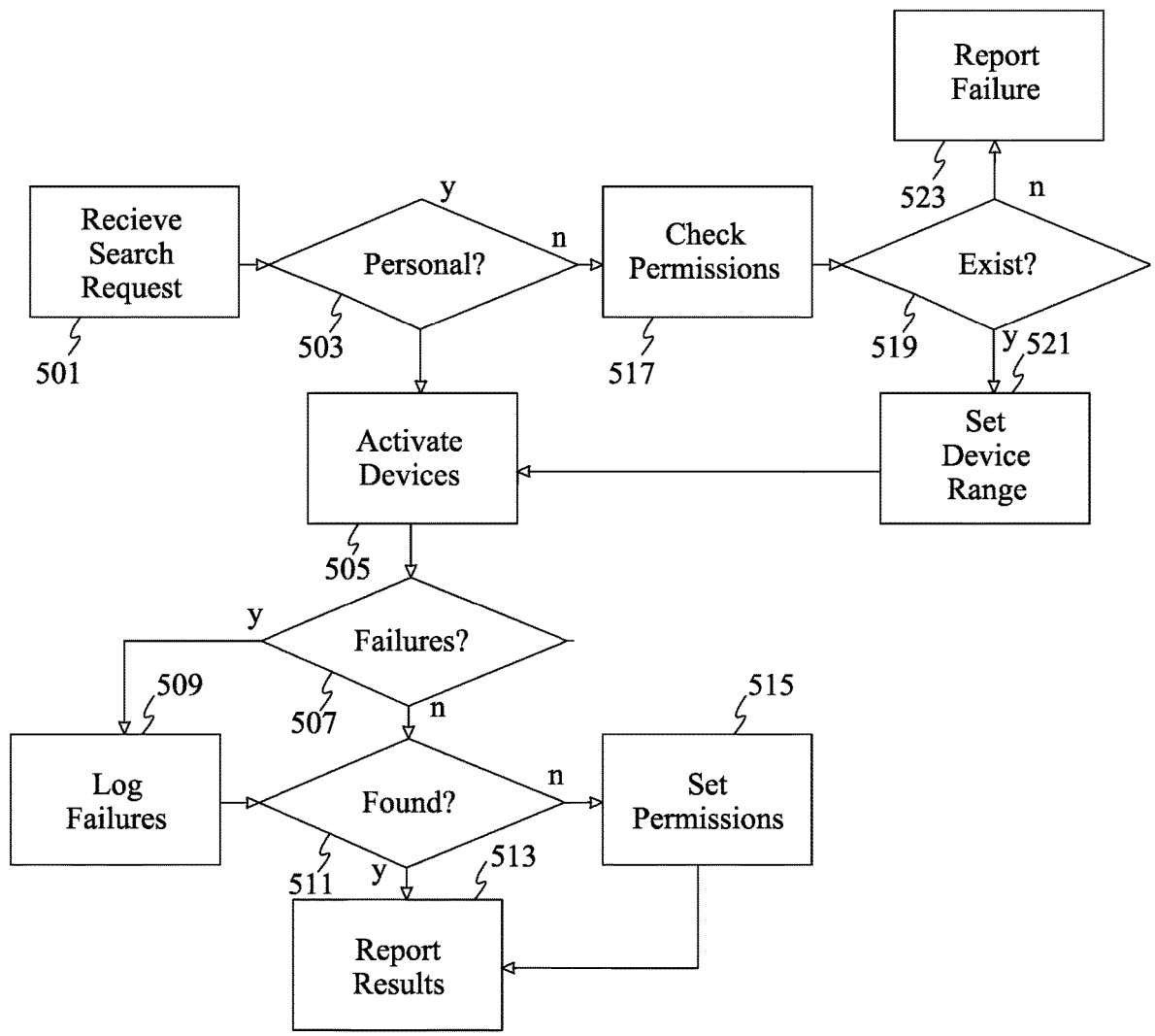
FIG. 5 shows an illustrative process for device location request handling.

FIG. 5 shows an illustrative process for device location request handling. This is an example of a process executable by, for example, a search process 233 executing on a cloud 231 server. In this example, the server receives a search request from a person seeking a digital tag at 501. These tags can include, for example, tags affixed to clothing, items, pet collars, etc. It can also include a tag ID associated with a given device, or a device's ID if the device is natively searchable based on an identification.

If the server is not going to use a requesting user's established personal network of search devices at 503, the server can determine what permissions exist for the search request at 517. For example, once a user has exhausted use of a personal network, the user may iteratively be granted a spectrum of permissions for increasing search networks. This can be determined based on, for example, a subscription agreement, an agreement to allow the user's own network to be included in a broader network, a value or type of object, etc. Requests to find items associated with missing children or pets (e.g., clothing or collars with tags, respectively) may be granted immediate high-priority and may have access to the widest reasonable possible search network, as time may be a critical factor. Other requests to find expensive items (jewelry, mobile devices, etc.) may be given eventual wide network permissions. Still further requests to find more mundane and less expensive items (shoes, jackets, etc) may have a maximum lower permission set, so as not to overtax the wide network.

While not the only model possible, this example contemplates a network that, at a wide end, includes a large spectrum of automotive and/or personal devices capable of sending a search request. If there are millions of participants, immediately leveraging the wide network could result in millions of daily or even hourly search requests, so in this example, the permission granting is iterative and geographically limited in order to mitigate overall network impact.

That is, for example, in a non-critical instance, permissions for all devices in a 1-mile radius of any current personal device (or previous known geographical location of the user or a device) could be granted, which effectively allows the user to first search within a confined radius of where the user typically is, or was recently, located. An expanded set could expand that radius or leverage temporary locations if not previously leveraged. For example, any destination of a user's vehicle or stationary location recorded by a user's mobile device could serve as another central point around which a permission radius could be established. A next-permission could include, for example, a radius along all routes traveled by a user within a predefined time-span. A final permission could then be, for example, all devices in a reasonable predefined geographic locality proximate to the user and/or where the user has been since the missing object was last in the user's possession (as could be indicated by the user). The tiering and nature of permissions can be done according to any reasonable and rationale strategy, if the idea of not over-using the network is desired in a given implementation.

If the user has any current and/or remaining permissions at 519 (i.e., if the maximum permission set has not already been searched), the server may set a range over which wide network devices may be leveraged at 521. As previously discussed, this can include a range around existing personal network devices, a range around a current user location, a range around known previous user locations/routes, etc. If the user has reached a maximum permission set for a given request, the server can report that the requested object cannot be found at 523.

Once a network is defined (e.g., the user's personal network of search devices and/or the server-defined permissible set of search devices), the server can send a request to the devices in the network to search for the identified object tag at 505. Since some or all devices may be offline at 507, which may be more relevant in a user's personal network, the server may log which devices were offline at 509. This could be reported back to the user as appropriate (e.g. "personal network search did not use your 2018 vehicle because the vehicle was offline," or "wide network search used 87% of known devices in the wide network, which were online").

Using a certain percentage of devices and/or all devices in a user personal network may also be a prerequisite for permission expansion, so in the vehicle-offline example above, the user may be required to activate the vehicle and/or confirm that the object is not located in the offline vehicle before being grated broader search permissions.

If the object is not found at 511, the server can set a broader set of permissions (subject to any other constraints) at 515. Otherwise, the server can report the device(s) detecting the object at 513. This can include, for example, reporting a personal device detecting the object and/or coordinates of wide network devices detecting the object. If sufficient wide-network devices detecting the object allow for accurate or approximate triangulation of the object, such results may also be reported (e.g., "6 devices in West Bloomfield detected the object, and based on the range and location of the devices, the object is determined to be at the following approximate coordinates/location . . . "

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety and are understood to be examples of types of processes that may be performed to achieve elements of the invention. Additional steps may be added or removed from the exemplary processes as desired.

With respect to the illustrative embodiments described in the figures showing illustrative process flows, it is noted that a general-purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising
   a server configured to:
      receive a request to locate a user device;
      determine one or more prior locations of the user device;
      determine a plurality of search devices in proximity to each of the one or more prior locations;
      send a request to one or more of the plurality of search devices to locate the user device, including a wireless identifier associated with the user device; and
      determine a current location of the user device based on one or more responses from the search devices that indicate the responding search devices detected the wireless identifier.

2. The system of claim 1, wherein the user device includes a mobile phone.

3. The system of claim 1, wherein prior location includes a last known geographic location.

4. The system of claim 3, wherein the geographic location includes a location indicated by a user mobile phone.

5. The system of claim 1, wherein the request includes one or more previous device locations used as the prior locations.

6. The system of claim 1, wherein current location of the user device is determined as a reported location of at least one of the responding search devices.

7. The system of claim 1, wherein the current location of the user device is determined based on triangulation based on reported locations of a plurality of the responding search devices.

8. A method comprising:
   receiving a request to locate a user device, at a server;
   determining one or more prior locations of the user device;
   responsive to receiving the request, determining a plurality of search devices based on the search devices having known present proximity to at least one of the one or more prior locations;

sending a request to one or more of the plurality of search devices to search for a wireless signal having a wireless identifier that is identified in the request and associated with the user device; and determining a current location of the user device based on one or more responses from the search devices that indicate the responding search devices detected the wireless identifier.

9. The method of claim 8, wherein the user device includes a mobile phone.

10. The method of claim 8, wherein the prior location includes a last known geographic location.

11. The method of claim 10, wherein the geographic location includes a location indicated by a user mobile phone.

12. The method of claim 8, wherein request includes one or more previous device locations used as the prior locations.

13. The method of claim 8, wherein the current location of the user device is determined as a reported location of at least one of the responding search devices.

14. The method of claim 8, wherein the current location of the user device is determined based on triangulation based on reported locations of a plurality of the responding search devices.

15. A non-transitory computer readable storage medium, storing instructions that, when executed, cause a processor to perform a method comprising:

receiving a request to locate a user device, at a server;

determining one or more prior geographic locations of the user device;

determining a plurality of search devices in proximity to each of the one or more prior locations;

sending a request to one or more of the plurality of search devices to locate the user device, including a wireless identifier associated with the user device; and determining a current geographic location of the user device based on one or more responses from the search devices that indicate the responding search devices detected the wireless identifier.

16. The storage medium of claim 15, wherein the user device includes a mobile phone.

17. The storage medium of claim 16, wherein the geographic location includes a location indicated by a user mobile phone.

18. The storage medium of claim 15, wherein the request includes one or more previous device locations used as the prior locations.

19. The storage medium of claim 15, wherein the current location of the user device is determined based on a reported location of at least one of the responding search devices.

* * * * *